Nov. 28, 1967          B. R. REUTER          3,355,221

SELF-PURGING, PNEUMATIC CONVEYING APPARATUS

Filed Jan. 3, 1966          2 Sheets-Sheet 1

BRIAN R. REUTER
INVENTOR

BY Wm. E. Ford

ATTORNEY

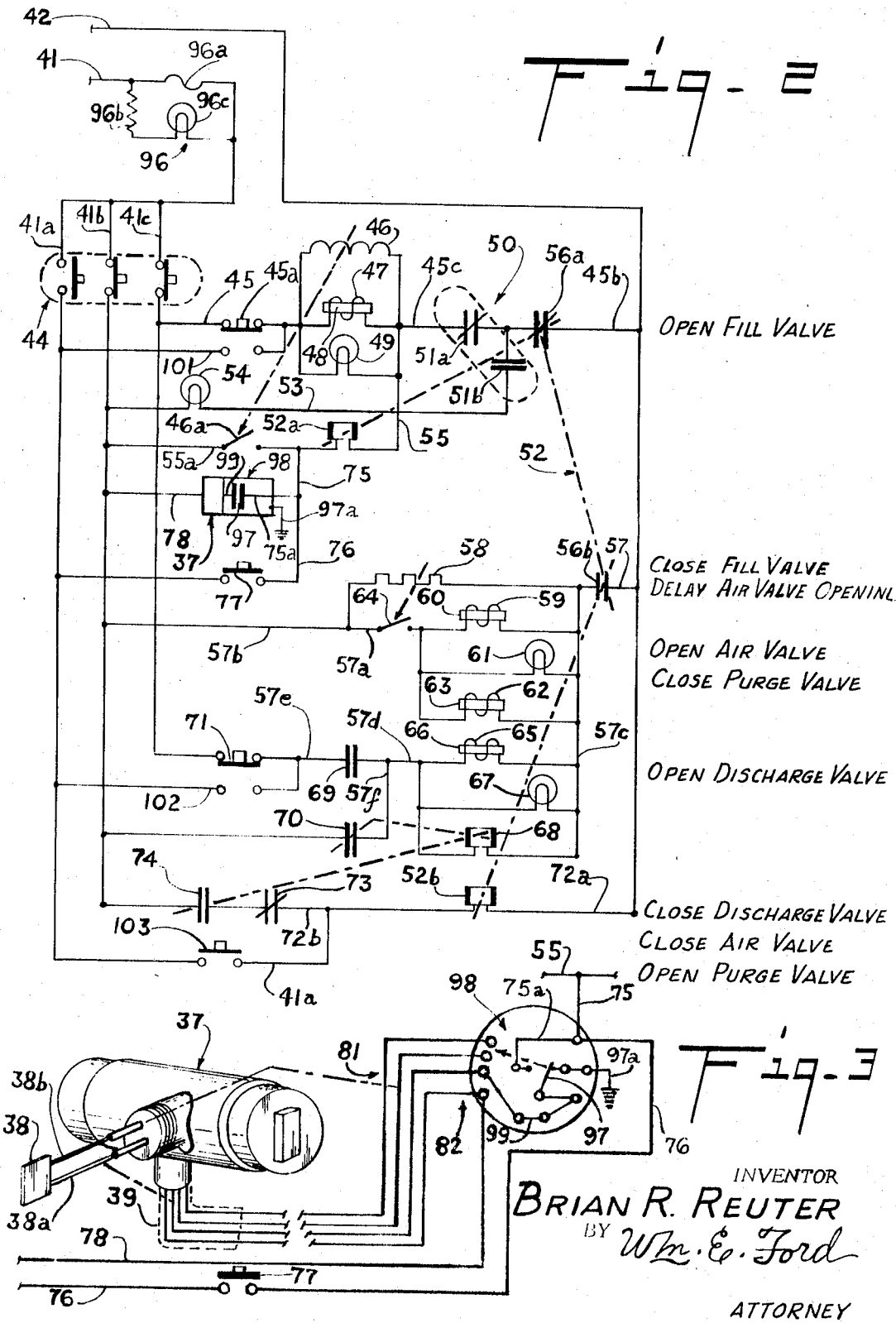

United States Patent Office 3,355,221
Patented Nov. 28, 1967

3,355,221
SELF-PURGING, PNEUMATIC CONVEYING
APPARATUS
Brian R. Reuter, Houston, Tex., assignor to Consolidated
Engineering Company, Inc., Houston, Tex.
Filed Jan. 3, 1966, Ser. No. 518,353
11 Claims. (Cl. 302—53)

ABSTRACT OF THE DISCLOSURE

A pressure vessel pump comprising circuitry including pressure switch means for sequentially: opening an inlet valve for gravity fill of pulverulent material over a gas permeable diaphragm, closing the inlet valve and opening a gas valve for gas passage through the diaphragm to fluidize the material and to pressurize the vessel, opening the discharge valve, closing the gas valve and discharge valve while opening a purge valve in a purge conduit bypassing the discharge valve, and purging the vessel (also in case of power or gas supply failure) as the pressure falls substantially to atmospheric, then repeating the cycle.

---

This invention relates to automatically controlled, self-purging, pneumatic conveying apparatus for delivering successive batches of substantially dry, free flowing material from a container by successive cyclic operation, the means for delivery generally being a compressed gas, as compressed air, which activates the material to be delivered as one of the earlier steps in its operation.

The material to be delivered may be any material which is capable of being activated, the material thereby being substantially dry and freely flowable. Thus the material may be granular, flocculent, pulverulent or otherwise comminuted, and for freest flow it preferably should be substantially dry and adapted to be suspended or activated by a pressurized gas, as compressed air. Generally the material is designed to fall by gravity from a hopper of substantially greater capacity than the activator, pump, container or housing which receives it in batches for activation and further delivery, a substantial plurality of batches of the material having to be activated and passed onwardly before the storage hopper is emptied.

It is consequently a primary object of this invention to provide automatically controlled apparatus and a method of automatically delivering thereby successive batches of a material from a large hopper to pass, batch by batch, into a substantially smaller capacity activator, to be delivered onwardly in manner that the activator is substantially completely emptied of one batch of material before receiving a successive batch thereinto.

It is also a further object of the invention to provide material delivering apparatus and a method of material delivery in which the initial steps of delivery may be timed steps and the final steps of delivery may be pressure actuated steps set in motion responsive to the attaining of a succession of predetermined pressures within the container.

It is also a further object of this invention to provide apparatus and method of this class in which the material actuates frequency sensitive means to set in motion a subsequent series of operations responsive to a cycle of time responsive steps.

It is another important object of the invention to provide apparatus and method of this class which may employ a material sensitive device, actuated responsive to frequency change, to safeguard overloading the container with initially delivered material, as in case of failure of time sensitive apparatus to close the container inlet valve.

It is another and further object of the invention to provide time actuated apparatus and time responsive methods for material delivery in successive volumes less than full container volumes, to a series of pre-selected delivery locations.

Other and further objects will be apparent when the specification herein is considered in connection with the drawings, in which:

FIG. 2 is an electrical diagram of apparatus for carrying out the operation of apparatus shown in FIG. 1; and FIG. 3 is an isometric view of material sensitive apparatus including the electrical diagram therefor, the apparatus being set in motion responsive to frequency change produced by the material, to close the fill valve.

Figure 1:
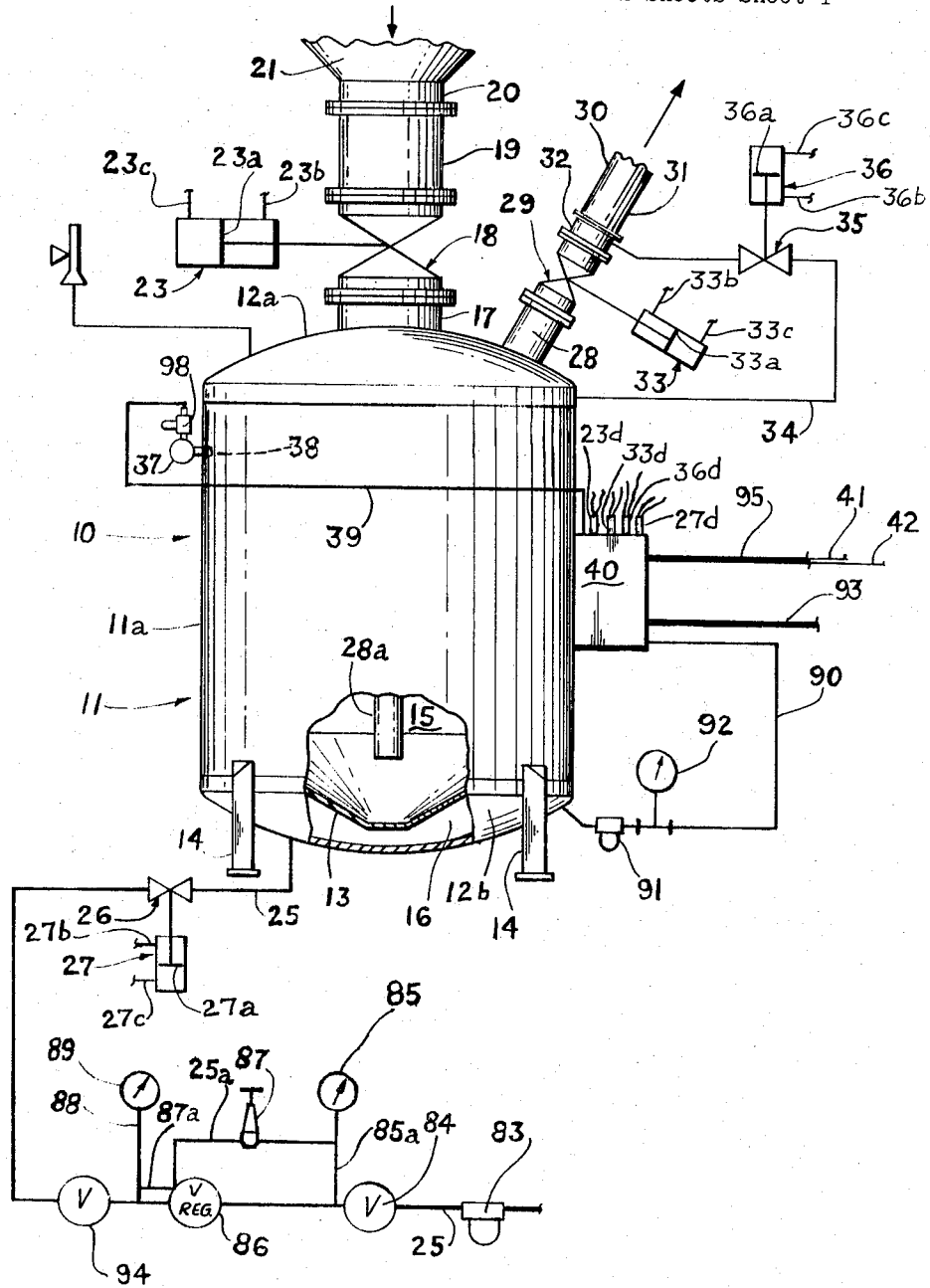
FIG. 1 is an elevational view, part in section and partially diagrammatic, showing an activator, pump or housing connected with a hopper and equipped with apparatus for controlling the delivery of successive batches of material therefrom.

Referring now to the drawings in which like reference numerals are applied to like elements in the various views, a material container, housing, pump or activator 10 is shown in FIG. 1 comprised of a shell 11 including a cylindrical main body 11a with upper end closed by a top comprised of a spherical segment or dome 12a and a bottom comprised of a spherical segment or lower closure 12b, the container being constructed after the general manner of conventional pressure vessels, and designed with safety factors, to withstand the highest pressures that may be developed therein.

The pressure vessel or container 10 is supported on legs 14 which upstand from a conventional base or grout, not shown. A gas permeable membrane or diaphragm 13 separates the container into an upper, or material plenum 15, and a lower, or gas plenum 16.

The dome 12a has an inlet flange or neck 17 connected centrally into the top thereof with an inlet gate valve or fill valve 18 being mounted thereon. A flexible nipple 19 is shown connecting the fill valve 18 with a discharge flange 20 from a hopper 21, the nipple 19 being shown as a flexible member for carrying out an optional function, to be hereinbelow described.

A valve operator 23 is shown diagrammatically, as disposed to open and close the gate valve 18, a piston 23a being shown provided in the valve operator 23, with instrument air admissible under the piston 23a through a conduit 23b to open the fill valve, and with instrument air being admissible through a conduit 23c above the piston 23a to close the fill valve. Obviously, the conduits 23b and 23c must be in a closed compressed air circuit with a pressurized reservoir, or otherwise selectively supplied with compressed air, to carry out their respective functions.

A compressed gas conduit 25 is shown connected into the lower end closure 12b of the shell or pressure vessel 11 and such compressed gas inlet line 25 has a gas inlet valve 26 therein, which is shown connected to be opened and closed by a valve operator 27, constructed and equipped in correspondence with the valve operator 23.

Also, a discharge outlet pipe 28 extends downwardly through the dome 12a to terminate in a pick-up end 28a disposed slightly above the gas permeable or air permeable membrane 13. A valve 29 is shown connecting this discharge outlet pipe 28 with a discharge conduit 30, disclosed as having a flexible nipple 31 therein downstream from a purge line connection nipple 32, the flexible nipple 31 being for an alternative purpose to be hereinbelow described.

The discharge valve 29 is shown operated by a valve operator 33, which is indicated as being constructed, and as having connections thereto, in correspondence with the fill valve operator 23.

A purge line 34 extends between the purge line connection nipple 32 and the material plenum or chamber 15 and has a purge valve 35 therein to control its opening and closing, a valve operator 36 being shown connected to the purge valve 35 for this purpose, such valve operator 36 being constructed, and having connections in correspondence with the fill valve operator 23. However, it may be pointed out, in this regard, that the purge valve 35 should be a normally open valve, whereas the fill valve 18, gas inlet valve 26, and discharge valve 29 are normally closed valves.

Additionally, the support body 37 for a safeguarding vibratory paddle 38, operative on the tuning fork principle, is shown connected into the cylindrical body 11a of the shell 11, the material sensitive paddle 38 being indicated in dotted lines in FIG. 1 as extending within the housing 10 near the top thereof, such paddle being operative to actuate the valve operator 23 to close the fill valve 18, as will be hereinbelow described.

An insulative cord 39, having therein the electrical conduits to the paddle 38, extends from the paddle support body 37 to a control box 40, to be hereinbelow described, and shown mounted on the exterior of the activator shell body 11a.

As shown in FIG. 2, a positive line 41 and a negative line 42 extend from a source of electrical power, the positive line 41 having three parallel lines 41a, 41b and 41c branching therefrom with the line 41a serving when manual control is to be used as will be hereinbelow described with the line 41b serving as a neutral third positive conductor and with the line 41c serving as the positive conductor when automatic control is to be employed. A three-way switch, indicated generally by reference numeral 44, is provided to control the selection of automatic or manual control, as desired, and as sown, the switch 44 indicates that automatic control has been selected, the conductors 41b, 41c thus being closed and the conductor 41a being open.

A conductor 45 extends from the conductor 41c, and a pushbutton switch 45a is shown in FIG. 2 as closing circuit in this conductor, the conductor 41c continuing to a junction with three parallel circuits including the circuit of a variable time delay relay 46, the circuit 47 for a solenoid 48 which operates the fill valve operator 23 shown in FIG. 1, and the circuit of an indicator light 49 which may be designated as a green light for illustrative purposes.

The conductor 45 continues as the conductor 45a and has contacts 51a therein of a double acting pressure actuated switch 50, such contacts 51a being normally closed at atmospheric pressure and opening upon increase of pressure in the gas plenum 16. The conductor 45c continues from the contacts 51a to a junction with a conductor 45b having therein the normally closed relay contacts 56a of a latching relay 52, the conductor 45b terminating at its connection to the negative power line 42.

A parallel circuit 53 extends from the neutral or central positive conductor 41b, to the junction of the conductors 45a, 45c, such parallel circuit also including therein the contacts 51b of the aforesaid pressure actuated switch 50, such contacts 51b being normally open at atmospheric pressure and closing upon increase of pressure in the aforesaid gas plenum 16. The circuit 53 also has therein an indicating light 54, designated as a yellow light for indicating purposes, as will be hereinbelow described.

Another parallel circuit 55a, 55 from the positive conductor 41b has the switch 46a therein which is closed by the variable delay relay 46 at the end of its preselected cycle, the circuit 55 also having therein the coil 52a of the latching relay 52, and the circuit 55 being continued by the circuit 45a, as aforesaid. The circuit 55, as thus closed, energizes the latching relay coil 52a to open the normally closed relay contacts 56a to break the aforesaid parallel circuits 46, 47, 49 and 55, and upon the solenoid circuit 47 being de-energized, the solenoid 48 retracts and moves the valve operator 23 to close the fill valve 18, both valve operator and fill valve being shown in FIG. 1.

The latching relay 52 is of the well known type, which, when its coil 52a is energized, it actuates conventional switching means which opens the normally closed contacts 56a, and pulls closed the normally open contacts 56b in a parallel circuit 57 extending from the negative conductor 42, in manner that the latching relay mechanism latches against any movement except that which may be imparted to the switching means to pull open the normally open contacts 56b, which can only be effectuated by the energization of the latching relay coil 52b, to be hereinbelow described as to operation.

The normally open contacts 56b are disposed in a circuit 57 from the negative power line 42, and which branches into four parallel circuits: 58, including a fixed time delay relay of the thermal delay type; a circuit 59 which includes the coil for operating a solenoid 60 connected to actuate the valve operator 27, shown in FIG. 1, to open and close the compressed gas inlet valve 26; a circuit which includes the light 61 therein, which is designated as a blue light, for purposes of illustration; and a circuit 62 including the coil for operating a solenoid 63 connected to actuate the valve operator 36, shown in FIG. 1, to open and close the purge valve 35.

A circuit 57a continues from the junction of the circuits 59, 61 and 62, and has a switch 64 therein which is closed by the fixed time delay relay 58 when its circuit has been closed for its fixed period of time, while a circuit 57b continues from the junction of the circuit 57a and the fixed time delay relay circuit 58, to the aforesaid neutral or positive conductor 41b.

Also, a circuit 57c continues from the junction of the circuits 59, 61 and 62 with the circuit 57, and branches into: a circuit 65 including the coil which operates a solenoid 66 which actuates the valve operator 33, shown in FIG. 1, to open and close the discharge valve 29; a circuit including a light 67 therein, which is designated as a red light, for purposes of illustration; and a circuit having a relay 68 therein; a circuit 57d continues from the positive side junction of the circuits 65, 67 and 68, and branches into a circuit 57e having a normally open pressure actuated switch 69 therein, to be hereinbelow described, the positive side connection being completed with the conductor 41c; and into a circuit 57f having a pair of contacts 70 therein operated by the relay 68, and terminating by connection with the neutral or positive conductor 41b. A pushbutton switch 71 is shown in FIG. 2 closing the circuit 41c adjacent its connection to the circuit 57e.

Additionally a circuit 72b, 72a connects the positive or neutral conductor 41c with the negative power line or conductor 42; the circuit 72b having in series therein a pair of contacts 74, (operated by the relay 68 substantially simultaneously with its operation of the contacts 70 in the circuit 57f), and a normally closed, pressure sensitive switch 73, as will be hereinbelow described; latching relay coil 52b which operates to break circuit closed by the hereinabove described relay contacts 56b.

The gas, as compressed air, which activates and transports the material which enters the container, shell, or pressure vessel 11, arrives from its source, as a compressor or pressurized reservoir, and passes, shown in FIG. 1, through a strainer 83 and a globe valve 84 on its way to being regulated as to the pressure at which it is to be supplied. Thus the gas is first measured by a high pressure gauge 85 in the top of a gauge pipe 85a which upstands from the main gas line 25 through which the strained gas passes on downstream. A smaller sized by-pass line 25a extends between the gauge pipe 85a and the aforesaid pressure regulating valve 86 in the main conduit 25, and has a pilot regulating valve or regulator 87 therein, thus to permit a finer and more responsive control of the pressurized gas on its way to the pressure vessel 11. A by-pass line 87a conveys the reduced pressure gas from the pilot regulator 87, and connects with an upstanding gauge pipe 88 above the main conduit 25, a low pressure gauge 89 being mounted on top of the gauge pipe 88 to indicate the lowered pressure of the gas.

A conduit 90 extends from the lower closure 12b to conduct pressurized gas from the gas plenum 16 to the control box 40, there to bear upon and cause actuation of the pressure sensitive switch 50, operative as hereinabove described, and to bear upon and cause actuation of pressure sensitive switches 69 and 73, to be further described as to operation hereinbelow.

Such switch actuating gas, from within the pressure vessel 11, enters the conduit 90 and passes through a strainer 91 therein, and on the panel box 40, a gauge 92 being provided to indicate the pressure of the actuating gas as it passes downstream of the strainer 91 on its way to the panel box pressure sensitive switches, as aforesaid. The instrument air required by the pressure sensitive switches, as contradistinguished from the actuating air or gas, and any other air or gas required to actuate any of the apparatus, as that shown in FIG. 2, or as that required to operate the valve operators shown in FIG. 1, may be brought to the panel box 40 through a conduit 93 for selective distiribution. Also, the power conductors 41, 42, from a source of electrical power, as a 60 cycle, 115 A.C. voltage source, may be brought to the panel box 40 through an insulated conductor cord 95.

A conventional fuse 96 is provided in the positive power line 41, indicated as comprising the conventional fuse strip 96a, and in a parallel circuit therewith, the conventional resistance 96b and indicating light 96c.

Also, a "fail-safe" or safeguarding, material sensitive, frequency change actuated, control assembly 37 is provided to insure the closing of the fill valve 18 in case the variable time delay relay 46 may not function to close the time-out switch 46a at the end of the time cycle period selected, as indicated diagrammatically in FIG. 2, and as shown partially diagrammatically and in greater detail in FIG. 3.

The "fail-safe" circuit 75 is shown extending from a point on the conductor 55 between the time-out switch 46a and the latching relay coil 52a, and is continued to a solids state relay housing 98, there to be connected to the junction between a conduit 75a to the normally open side of a relay switch 97, and a circuit 76 which extends to the positive conductor power line 41a, the circuit 76 having the push-button switch 77 therein, to be hereinbelow described. Normally, the relay switch 97 closes contact between a grounded conductor 97a (and thus the negative power line side 42), and a conductor means 99 between the relay switch 97 and the negative terminal of a coil 82 in the control housing 37.

The coil 82, within the housing 37, energizes a plunger or armature, not shown, in manner that it normally vibrates 120 cycles per second to impart vibration at this frequency to the tuning fork tine 38a which is connected to the paddle or vibrator 38. Thus normally the tine 38b also vibrates with the paddle 38 at 120 cycles per second. The vibrations of the tine 38b are imparted to an armature, not shown, which normally actuates a second coil 81, at an imparted voltage, at 60 cycles per second frequency.

An induction coil, not shown, is imposed across the terminals of the coil 81 within the plug so disposed with relation to the switch 97 that this switch may be shifted when the differential between the line voltage and the imparted voltage achieves a certain value, as is the case when material entering the container or activator 10 extends at such an angle of repose to interfere with, reduce, or stop the vibrations of the paddle 38.

When the aforesaid induction coil across the terminals of the coil 81 thus shifts the switch 97 to close circuit from the neutral or positive side conductor 41b, by way of the conductor 78, the coil 82, and the conductor 99, through the switch 97, as thus shifted, and by way of conductors 75a, 75, 55 (including the latching relay coil 52a), and on through the conductor 45c, the closed switch contacts 51a, and the circuit 45b (including the latching relay closed contacts 56a), to the negative power line 42. The energization of the latching relay coil 52a in the circuit 55 results in the latching relay breaking the circuit 45b by shifting open the contacts 56a, whereby the solenoid winding 47 is de-energized to actuate the solenoid 48 to operate the valve operator 23 to close the fill valve 18.

Obviously the quicker the "fail-safe" switch 97 is operated after a failure of the variable time delay relay 46 to close the time-out switch 46a, the less the material from the hopper 21 can overfill the container 10, and the closer the delivered batches of material may be controlled to deliver a desired lesser volume per batch.

Also, it is obvious that the variable time delay relay 46 may be omitted entirely, together with its time-out switch 46a, and in this case the frequency control device 37 alone can be relied upon to actuate the valve operator 23 to close the fill valve 18.

On occasion it may be desirable to operate the filling and evacuation of the container 10 by manual control of the sequence of steps, rather than automatically, as hereinabove described. For such occasion, it may be considered that the variable time delay relay 46 and its timing out switch 46a are immobilized. Then a circuit 101 is provided, parallel with the circuit 45, to extend from the positive conductor 41a and to connect with the circuit 45 between the pushbutton 45a and the circuit junction 46, 47, 49. Also, in this case there also serves the aforesaid circuit 76 from the circuit 41a to the junction of circuits 75, 75a, and having the pushbutton 77 therein; also the circuit 102, parallel with the circuit 57e and connected thereinto between the pushbutton 71 and the normally open pressure sensitive switch 69; also the positive power circuit 41a is extended to connect with the junction of the circuits 72a, 72b, and to have the pushbutton 103 therein.

Thus, with the three-way switch controlling the parallel conductor lines 41a, 41b and 41c turned from the position shown in FIG. 2, in manner that the conductors 41a, 41b are closed, the conductor 41c thus being left open. Beginning with the container 10 empty and at atmospheric pressure, the pushbutton 45a may be pushed downwardly and held to close the circuit 101. The circuit 47 is thus energized so that the solenoid 48 actuates the valve operator 23 to open the fill valve 18. Then, the pushbutton 45a may be released from closing the circuit 101, thus breaking circuit through the solenoid coil 47 so that the solenoid 48 actuates the valve operator 23 to close the fill valve 18.

With a batch of material delivered into the container 10 in amount determined by the length of time the pushbutton 45a has closed the circuit 101, activation of the material may be started, after the pushbutton 45a has been released, by manipulating the pushbutton 77 to close the circuit 76. Circuit is thus closed through the circuit 75, the circuit 55 including the latching relay coil 52a, and to the negative power line side 42, by way of circuit 45c, closed contacts 51a of the pressure sensitive switch 50, and the circuit 45b, including the latching relay closed contacts 56a therein. This energizes the latching relay coil 52a to operate the latching relay 52 to break the contacts 56a and close the contacts 56b.

Circuit is thus closed to the fixed time delay relay 58, which actuates the "time out" switch 64 to close the solenoid coil circuit 59, thus to actuate the valve operator 27 to open the compressed air valve 26; also the solenoid coil circuit 62 is closed whereby the solenoid 66 actuates the valve operator 36 to close the purge valve 36.

Then, the operator of the apparatus may observe the gauge 92, and when the pressure indicates that the vessel is ready to discharge, or when the operator appreciates that a proper time interval after the opening of the gas inlet or compressed air valve 26 has taken place, the pushbutton 71 may be pushed to close the circuit 102, the normally open, pressure sensitive switch 69 being closed by the pressure that has built up in the vessel.

Thus, as aforesaid, the armature 65 may move to set in operation the opening of the discharge valve 29, while circuit is closed to operate the second relay 68 so that it closes the circuit 57f, and closes the contacts 74 to partially close the circuit 72b. Discharge may thus continue as long as the pushbutton 71 is held closing circuit 102, or even if the operator may now release the pushbutton 71, since in this case the circuit continues completed through the contacts 70 in the circuit 57f, even after the pressure has fallen enough to cause the pressure sensitive switch 69 to open.

Thus to purge the vessel 10 after the pushbutton 71 has been released, or thereafter, or at any time, with the three-way switch 44 turned to manual operation (41a, 41b closed), it is only necessary to push the pushbutton 103 to close circuit with the circuit 72a to energize the latching relay coil 52b, which, when energized, operates, as aforesaid, to close the circuit 45b and to break the circuit 57, whereby the purge valve 35 is opened and the compressed air valve 26 and discharge valve 29 are closed. Then, as the purge pressure diminishes the normally closed, pressure sensitive switch 73 opens, and as the pressure falls further to substantially atmospheric pressure, the contacts 51a of the pressure sensitive switch 50 close, and the pushbutton 45a may again be pushed to close the circuit 101 to admit material into the container 10.

Respective conduits 23b, 27b, 33b and 36b connect into the respective fill, compressed gas, materials delivery and purge valve operator cylinders, 23, 27, 33 and 36, under the respective piston heads 23a, 27a, 33a and 36a, and respective conducits 23c, 27c, 33c and 36c connect into such cylinders above the respective piston heads therein. Thus, as shown in FIG. 1, conductor cords or sleeves 23d, 27d, 33d and 36d for the respective conduits for the respective valve operator cylinders aforesaid, are provided to extend from the control or panel box 40, where conventional instrument air, as from the instrument air conduit 93, may pass through respective conventional solenoid actuated valves, not shown, as operated by the aforesaid solenoids 48, 60, 66 and 63, to admit the operative air, gas or fluid, selectively into the conduits 23b or 23c; into the conduits 27b or 27c; into the conduits 33b or 33c; and into the conduits 36b or 36c; selectively to open or close the aforesaid fill valve 18, compressed gas valve 26, materials delivery valve 29 and purge valve 35.

As shown in FIG. 2, a light 49 is in circuit parallel with the solenoid circuit 47 and the variable time delay relay circuit 46, and thus the light 49 is on when the fill valve 18 is open; also a light 61 is in a circuit parallel with the solenoid circuit 59 which actuates the valve 26 which admits the material activating compressed gas, and with the solenoid circuit 62 which closes the purge valve; and also a light 67 is in a circuit parallel with the solenoid circuit 65 which actuates the opening of the materials delivery valve 29. Additionally, a light 54 is shown in a circuit 53 which is complete when the latching relay 52 is actuated to close the contacts 56a while the pressure within the container is still high enough to maintain closed the contacts 51b of the pressure sensitive switch 50. Thus, this occurs after the purge valve 35 has been re-opened by opening of the latching relay contacts 56b, to permit the purging of the container by the residual pressure therein until such pressure drops to substantially atmospheric so that the pressure sensitive switch 50 is actuated to open the contacts 51b and close the contacts 51a, thereby breaking the circuit 53 which contains the light 54 therein.

The lights 49, 61, 67 and 54 may have selectively differently colored bulbs, as, respectively, green, blue, red and amber, thus to indicate, respectively, that filling, activating, discharging and purging are taking place.

The respective valve operators 23, 27, 33 and 36 may be used to operate the respective fill valve 18, compressed gas delivery valve 26, material delivery valve 29 and purge valve 35, as shown, but it is often not necessary, in the case of light duty installations, and/or in the case of the valves 26, 29 and 35, that special valve operators be required for their operation. In such cases the solenoids 60, 66 and 63 may thus be connected directly to the respective valves 26, 29 and 35 to effectuate their operation.

As to the gas permeable membrane 13, shown in FIG. 1, this may be variously constituted to carry out various requirements. The membrane 13 may be a flexible diaphragm as of a heavily woven cloth, as of cotton, or of a synthetic or plastic cloth as of nylon or Dacron. Also instead of being flexible the membrane may be rigid or substantially rigid. Thus it may be of woven metal, or of non-corrosive woven metal, such as stainless steel, to combat corrosion. Also it may be of a porous ceramic, also to avoid corrosion, as well as to provide a stable membrane. An additional advantage in there being selectivity in the synthesis of the membrane resides in the fact that a wider range of materials can be handled to pass through the membrane under the most advantageous conditions where this selectivity is available.

Also, as to the "fail-safe" feature of the vibrating paddle 38, the sensitivity of this feature is such that it can be regulated to operate almost instantaneously as a container first starts to overfill, so that the relay 52a is energized to operate the latching relay 52 immediately the variable time delay relay 46 fails to function.

Additionally, as set forth hereinabove, the vibratory paddle 38 may be used instead of the variable time delay relay 46, as the primary functional element to actuate the closure of the fill valve 18. In such case the sensitivity of the paddle 3 to adjustment, can determine the promptness of sensitivity to material to close the relay switch 97.

As may be seen, the structures for handling actuatable materials, and the methods of use are not limited by the structures and methods hereinabove disclosed, but other structures and methods may be employed as well as such may fall within the broad scope of the invention, and within the broad scope of interpretation claimed for, and merited by, the appended claims.

What is claimed is:

1. Material transporting apparatus comprising a container including a material plenum above, a gas plenum below, and a gas permeable diaphragm thereinbetween, a solenoid actuated, valve operator moved, fill valve controlled inlet from a material source, a solenoid actuated, valve controlled, material discharging duct from said material plenum, a solenoid actuated, valve controlled gas duct connecting gas plenum and a regulated compressed gas source, a solenoid actuated, valve controlled, purge by-pass connecting material plenum and discharge duct downstream from said discharge valve, an electrical power source to circuitry connecting said solenoids, a variable and a fixed time delay relay, a latching first relay, a second relay, a normally open, a normally closed, and a control pressure sensitive switch, said control switch closing circuit, as container pressure falls to a predetermined initial, substantially atmospheric, to open said fill valve and to start the interval of a preselected variable time delay switch to lapse, thus to actuate said latching first relay to open the variable time delay switch circuit, to close said fill valve, and to close circuit to said fixed time delay switch, which, after its fixed time, opens said gas supply valve and closes said purge valve, gas now increasing container pressure to successively higher predetermined values, as successively, said control switch opens, said normally closed switch opens, and said normally open switch closes to open said discharge valve and to actuate said second relay to close discharge valve bypass circuit and to partially close latching relay circuit, material now discharging and container pressure dropping to successively lower predetermined values, as successively, said normally open switch opens and said normally closed switch closes to complete latching relay circuit closure to close said gas supply and discharge valves, to open said purge valve, and to deenergize said second relay, said material purging until container pressure further drops to initial pressure to start repetition of the aforesaid cycle.

2. Material transporting apparatus comprising
(a) a pressure vessel including
(b) a gas permeable diaphragm bridging the lower part of said vessel above the bottom thereof and dividing it into a
(c) material plenum thereabove and a
(d) gas plenum therebelow, a
(e) fill valve to admit flowable material through the top of said vessel into said material plenum to upstand from said diaphragm, a
(f) compressed gas inlet connection including a gas valve into said gas plenum,
(g) a discharge connection from the upper part of said material plenum including a
(h) discharge valve disposed in said discharge connection, a
(i) purge connection from the upper part of said material plenum by-passing said discharge valve and including a
(j) purge valve disposed in said purge connection, a
(k) pressure sensitive control means, and
(l) circuitry including said control means and automatically operable sequentially to open said fill valve, to close said fill valve, then to close said purge valve while opening said gas inlet valve to admit pressurized gas substantially uniformly through said diaphragm and to activate said material to a high state as the pressure rises in excess of a predetermined high pressure to actuate said press sensitive control means to open said discharge valve for said material to pass upwardly and onward through said discharge valve and outwardly through said discharge connection, the pressure falling below a predetermined lower pressure to actuate said pressure sensitive control means to close said discharge valve and said gas inlet valve and to open said purge valve, the residual compressed gas purging upwardly through said purge valve and said purge connection and on outwardly through said discharge connection, the pressure falling to approximately atmospheric whereby to open said fill valve, as aforesaid.

3. Material transporting apparatus as claimed in claim 2, which additionally includes material sensitive, frequency change operated means provided in said circuitry to insure the closing of said fill valve in case of failure of said circuitry as claimed in claim 2.

4. Material transporting apparatus as claimed in claim 2, in which the circuitry means for closing said fill valve comprises material sensitive, frequency change operative means.

5. Material transporting apparatus as claimed in claim 2, in which the means in said circuitry for opening said fill valve includes means operable in accordance with selective time cycle intervals, and in which the means for initiating the opening of said gas inlet valve and the closing of said purge valve includes means operable over a predetermined time interval.

6. Material transporting apparatus as claimed in claim 2, in which said fill valve, said gas inlet valve, said discharge valve, and said purge valve each includes a valve operator.

7. Material transporting apparatus as claimed in claim 2, in which said fill valve includes a valve operator.

8. Material transporting means as claimed in claim 2, in which said circuitry is substantially all included in a box mounted on the side wall of said vessel.

9. Material transporting means as claimed in claim 2, in which said circuitry includes a latching relay operable in one direction to close said fill valve, and operable in the other direction to close said discharge valve and said gas inlet valve while opening said purge valve.

10. Apparatus as claimed in claim 2, whereby upon gas supply failure with said purge valve open, it remains open so that said vessel is purged, and whereby upon gas supply failure with said purge valve closed, the vessel pressure must drop to said lower predetermined pressure whereby said purge valve must open to purge said vessel.

11. Apparatus as claimed in claim 2, whereby in case of power failure said discharge valve and said gas valve are closed and said purge valve opens, if not open, and stays open, if open, thus to purge said vessel in any event.

References Cited

UNITED STATES PATENTS

| | | | |
|---|---|---|---|
| 1,935,843 | 11/1933 | Goebels | 302—53 |
| 2,032,367 | 3/1936 | Kennedy et al. | 302—53 |
| 2,124,018 | 7/1938 | Vogel-Jorgensen | 302—53 |
| 2,380,651 | 7/1945 | Jeffery | 302—53 |
| 2,668,085 | 2/1954 | Baresch | 302—53 |
| 2,678,240 | 5/1954 | Snow | 302—53 |

ANDRES H. NIELSEN, *Primary Examiner.*